J. Shelley,
Mortar Mixer,
No. 71,231.  Patented Nov. 19, 1867.
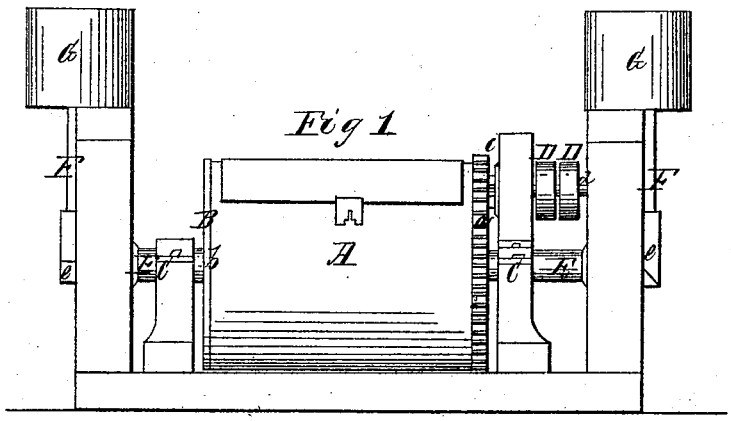
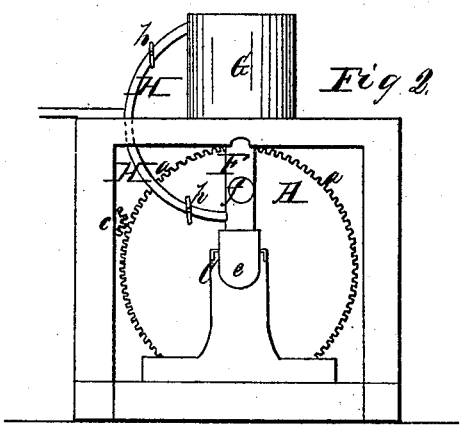
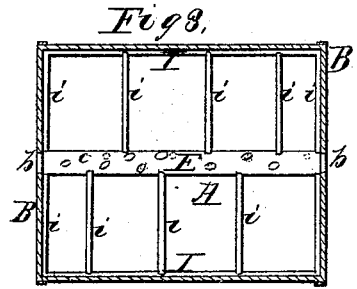
Witnesses
Geo. Wisant
M. J. Ketcham
Inventor.
John Shelley

United States Patent Office.

JOHN SHELLEY, OF HARLEM, NEW YORK.

Letters Patent No. 71,231, dated November 19, 1867.

---

IMPROVED APPARATUS FOR MIXING MORTAR FOR MAKING BUILDING-BLOCKS, &c.

---

The Schedule referred to in these Letters Patent and making part of the same.

---

TO ALL WHOM IT MAY CONCERN:

Be it known that I, JOHN SHELLEY, of Harlem, in the county and State of New York, have invented certain new and useful Improvements in Machinery and Apparatus for Mixing Lime and Sand for Making Building-Blocks and for other purposes; and the following is a full, clear, and exact description of the same, reference being had to the accompanying drawings, making a part of this specification, in which—

Figure 1 represents a side elevation of the apparatus or machine for mixing lime and sand.

Figure 2 shows an end-view elevation of the same, with the water and steam pipes and stop-cocks.

Figure 3 is a plan of the rotating cylinder with the top or one-half of the cylinder removed, showing the internal arrangement of the pipe for admitting both the steam and the water, and the scrapers to prevent the silicate from adhering to the ends and inside of the cylinder.

The object of my invention is to thoroughly mix lime and sand and produce a mortar for making building-blocks.

My invention consists in the introduction of steam, and also the requisite quantity of water, through the same pipe, into the centre of the rotating cylinder, distributing it evenly, while it is revolving, throughout the entire mass; also in securing to the steam and water pipe stationary frames and blades for cutting and mixing and preventing the mortar from adhering to the ends and inner portion of the cylinder; likewise in the arrangement of the water-tanks, stop-cocks, and pipes, so that either steam or water may be forced into the cylinder at one or at both ends at the same time.

To enable others to make and use my invention, I will describe it more fully, referring to the drawings, and to the letters marked thereon.

I make the cylinder A of strong boiler-iron, or it may have cast-iron heads B B with hollow trunnions $b$ $b$ or journals to run on, they being fitted into metal boxes C C, so as to sustain the heavy weight in the cylinder A and yet turn easily. On one end of the cylinder A I have a spur-gear, $a$ $a$, surrounding it, and a pinion, $c$, on a shaft, $d$, with pulleys D to drive and rotate the cylinder A. Through the centre of the cylinder A is a hollow pipe, E, extending out through both of the hollow trunnions $b$ $b$, with elbow-joints $e$ $e$, into which the water pipes F F are fitted and connect with the water-tanks G G, which are elevated to a suitable height above them, so that the water will be forced into the cylinder A when the cocks $f f$ are turned to admit it. Connected with the water pipes F F are the steam pipes H H with their stop-cocks $h$ $h$, so that the steam from the boiler can be admitted into the cylinder A under any desired pressure, and controlled by the stop-cocks $h$ $h$ at pleasure, either from one or both ends of the cylinder; the arrangement being such that either water or steam may be alternately let in or shut off from the cylinder, as the necessities may require. The hollow pipe E, which extends through the centre of the cylinder A, is perforated with holes on its under side to let the steam and water escape, while none of the ingredients contained in the cylinder will be likely to get into the pipe to obstruct it. To the pipe E are secured arms $i$ $i$ $i$, extending out at right angles to near the internal diameter of the cylinder A, on the ends of which are fastened longitudinal bars or scrapers I I, which, being stationary, come so near the cylinder as to prevent the mixture of the lime and sand from adhering to the inner surface as the cylinder A is revolving, while the process of mixing is going on.

In arranging the cylinder A and the other fixtures for preparing the material to be compressed into artificial stone or building-blocks, if it is not convenient to have the water-tanks G G elevated to a sufficient height to force the water into the cylinder A, they may be provided with pipes connecting the steam-boiler with the tops of the water-tanks, they having covers fitted steam-tight, so that the water can be forced in by the pressure of steam, thereby making the apparatus very compactly arranged and complete in its operation.

It will readily be seen that, by my arrangement for admitting both steam and water into the cylinder while it is revolving and the substance it contains is in motion, the ingredients cannot fail to become thoroughly mixed and the process of calcination will be much more rapid and perfect, which is a matter that experience has taught to be of the greatest importance in the process of preparing the lime and sand for moulding into building-blocks or artificial stone.

Having thus fully described my invention, what I claim as new, and desire to secure by Letters Patent, is—

1. I claim the stationary hollow pipe E, passing through the trunnions $b$ $b$ and extending longitudinally through the centre of the cylinder A, to which the water and steam pipes are both connected, the same being provided with holes or outlets on the under side, as herein described.

2. In combination with the stationary pipe E, the arms *i i i i* and scrapers or blades I I, I claim the revolving cylinder A, operating in the manner as herein described, for the purposes set forth.

3. I claim the arrangement of the water-tanks G G, the connecting water and steam pipes H H, with their stop-cocks *h h* placed at one or at both ends of the revolving cylinder, so that both steam and water may be alternately introduced into the mixture, substantially in the manner as herein set forth.

JOHN SHELLEY.

Witnesses:
J. B. WOODRUFF,
W. J. KETCHUM.